Patented May 4, 1943

2,318,211

UNITED STATES PATENT OFFICE 2,318,211

STABILIZATION OF STYRENE

Stanley George Foord, London, England, assignor to International Standard Electric Corporation, New York, N. Y.

No Drawing. Application November 14, 1940, Serial No. 365,656. In Great Britain December 24, 1937

3 Claims. (Cl. 260—669)

This invention relates to a process of treating styrene by the use of inhibitors of polymerization that are only sparingly soluble in styrene (i. e. to the extent of less than 0.1%).

Such inhibitors appear to act in the inhibition of polymerization by slowly combining with the styrene. During such combination no polymerization takes place and the period elapsing before the start of polymerization is herein termed the induction period. Thus an extended induction period can be produced by adding the required amount of sparingly soluble inhibitor to the styrene. Some of the inhibitor dissolves in the styrene, i. e. enough to form a saturated solution. As this inhibitor is used up by reacting with the styrene more goes into solution. Whatever the theoretical explanation, the undissolved excess of inhibitor is gradually used up during the induction period. Such sparingly soluble inhibitors are catechol, hexamine (i. e. hexamethylene tetramine), hydroquinone, hydroxylamine hydrochloride, resorcinol, 1.5 dinitroanthaquinone, and an inorganic salt of methyl p.aminophenol such as the sulphate (metol).

Hydroquinone has previously been suggested as a stabilizer of styrene against polymerization, but the conclusion was reached that in a given period of time a lessened degree of polymerization would take place in the presence of hydroquinone than in its absence. The other substances mentioned above have, however, not previously been suggested as stabilizers of styrene for an extended period. Moreover, the manner in which these sparingly soluble substances mentioned above act in inhibiting polymerization of styrene is my discovery.

When using an inhibitor of polymerzation of styrene, it is necessary to remove the inhibiting effect before the polymerization. With known inhibitors such as benzoquinone and hydroquinone it has previously been thought necessary to remove excess of inhibitor from the styrene by some such process as washing out with caustic soda or distillation under reduced pressure.

At an elevated temperature a sparingly soluble inhibitor when present in excess produces a period during which no polymerization takes place and thereafter may produce a period during which the polymerization is considerably retarded. If therefore styrene be heated with undissolved excess of inhibitor present, in an attempt to polymerize the styrene, the inhibitor in solution is used up in combining with styrene and thus first inhibiting and then retarding polymerization, and as it is used up more inhibitor goes into solution and when in solution continues the retarding of polymerization until all the inhibitor both free and dissolved is used up.

It will be seen therefore that the inhibitor must be removed before polymerization is attempted, if this is to be completed in any reasonable time. I have discovered however that when a sparingly soluble inhibitor is used it is only necessary to remove the undissolved inhibitor. I have discovered that the extent to which the time of heating required to effect polymerization is prolonged by the amount of inhibitor remaining in solution, i. e. the amount required to produce a saturated solution, is inconsiderable at the temperatures normally used for polymerization, e. g. 120° C.

According to the present invention a process for treating styrene comprises adding to the styrene an amount of a sparingly soluble inhibitor of polymerization sufficient to maintain a saturated solution thereof in the styrene over the period of time during which polymerization of the styrene is to be inhibited and then filtering off undissolved inhibitor prior to polymerization of the styrene.

The following table shows the induction periods of styrene at 60° C. caused by various sparingly soluble inhibitors when added in the percentage by weight stated in the second column of the table:

| Inhibitor | Per cent added | Induction period at 60° C. |
|---|---|---|
| | Per cent | Hours |
| Hydroquinone | 0.5 | 170 |
| Catechol | 0.5 | 170 |
| Metol | 0.5 | 110 |
| Hexamine (hexamethylene tetramine) | 0.5 | 30 |
| Hydroxylamine hydrochloride | 0.5 | 50 |
| Resorcinol | 0.5 | 30 |
| 1.5 dinitroanthraquinone | 0.5 | 350 |

At the completion of the induction period the styrene commences to polymerize at a rate which rapidly increases to a maximum, and then continues steadily, the rate of polymerization being a function of the temperature and of the nature and concentration of the substance that has been added.

In all the above cases, with the exception of catechol, the rate at which polymerization proceeds after the induction period is not greatly affected by the presence of the added substance unless it is present in excess. Catechol, however, causes a very definite and perceptible slowing down of the rate of polymerization.

The induction period for each of the above substances is given at 60° C. instead of at room temperature because of the length of time that would be necessary to verify the length of the induction period at room temperature, since this is very long, being related to the induction period at higher temperatures by an exponential law.

I have found, however, that with these sparingly soluble inhibitors, filtration is sufficient to remove all inhibitor save such a small quantity that the increase in induction period at polymerization temperature, e. g. 120° C., due to the presence of that quantity, is inappreciable.

A good inhibitor for this purpose is hydroquinone. I have found that hydroquinone dissolves in styrene at room temperatures only to the extent of 0.001%. Consequently, in order to polymerize styrene to which has been added a large amount of hydroquinone, the undissolved hydroquinone is filtered off, leaving styrene with only 0.001% of dissolved hydroquinone. The induction period at 120° C. of this material is not more than 10 minutes, i. e. inappreciably greater than that of pure styrene.

Some of the substances mentioned are, compared with hydroquinone, much more soluble, but still must be classed as sparingly soluble, i. e. to the extent of less than 0.1%. It has been mentioned above that catechol not only acts as an inhibitor of polymerization but also slows down the rate of polymerization at the end of the induction period. This latter effect is only appreciable, however, in the presence of so much catechol that some of it is originally undissolved, but after filtration the effect of the amount left in solution is inappreciable.

The present application is a continuation-in-part of my U. S. Patent No. 2,225,471, issued December 17, 1940, and entitled "Stabilization of styrene."

What is claimed is:

1. A process for treating styrene which comprises preserving said styrene from polymerization for storage purposes by adding to the styrene an amount of hexamine, said amount being more than will dissolve in the styrene, and mechanically removing when it is desired to use said styrene in polymerized form undissolved hexamine prior to polymerization of the styrene.

2. A process for treating styrene which comprises preserving said styrene from polymerization for storage purposes by adding hexamine to the styrene in excess of the amount required to produce a super-saturated solution of hexamine in the styrene, and when it is desired to use said styrene in polymerized form filtering off undissolved hexamine, and polymerizing the styrene.

3. A process for treating styrene which comprises preserving said styrene from polymerization for storage purposes by adding hexamine to the styrene in excess of the amount required to produce a super-saturated solution of hexamine in the styrene, and when it is desired to use said styrene in polymerized form filtering off the undissolved hexamine, allowing the remaining dissolved hexamine to combine with the styrene, and polymerizing the styrene.

STANLEY GEORGE FOORD.